Nov. 9, 1965   T. W. PECK   3,216,551
ARTICLE ORIENTING APPARATUS
Filed Sept. 28, 1964   10 Sheets-Sheet 1

FIG.1.

INVENTOR
THOMAS W. PECK

BY Cushman, Darby & Cushman
ATTORNEYS

FIG.2.

Nov. 9, 1965     T. W. PECK     3,216,551
ARTICLE ORIENTING APPARATUS
Filed Sept. 28, 1964     10 Sheets-Sheet 4

INVENTOR.
THOMAS W. PECK
BY
Cushman, Darby & Cushman
ATTORNEYS

Nov. 9, 1965  T. W. PECK  3,216,551
ARTICLE ORIENTING APPARATUS
Filed Sept. 28, 1964  10 Sheets-Sheet 9

INVENTOR
THOMAS W. PECK
BY
Cushman, Darby & Cushman
ATTORNEYS

United States Patent Office 3,216,551
Patented Nov. 9, 1965

3,216,551
ARTICLE ORIENTING APPARATUS
Thomas W. Peck, Horseheads, N.Y., assignor to Thatcher Glass Manufacturing Company, Inc., New York, N.Y., a corporation of New York
Filed Sept. 28, 1964, Ser. No. 402,684
41 Claims. (Cl. 198—33)

This application is a continuation-in-part of my copending application Serial No. 243,205, filed December 5, 1962, now abandoned, which, in turn, is a continuation-in-part of my earlier application Serial No. 155,552, filed November 29, 1961, now abandoned, and the invention herein as well as therein relates to apparatus for similarly orienting articles arriving at an article orienting station in a conveying line. In one embodiment, the articles at the orienting station turn, or at least try or tend to turn, in a given angular direction, a substantial angle if they enter the station in one orientation, but start proceeding straight through the station if they enter in a different orientation. In another embodiment, the articles tend to move straight through the station regardless of their entering orientation but those in the wrong orientation are sensed and oriented properly.

In a more specific sense, this invention relates to similarly orienting articles of non-cylindrical shape, and in particular to facing succeeding ones of such articles with like sides in the same direction, the shape of each such article being non-symmetrical about a vertical plane extending through its major horizontal axis.

An example of an article having such a shape is a glass container, for example a flask or beverage bottle, which has one of its external sides generally convex shaped and the opposite external side generally concave shape. Such a container is normally relatively narrow compared to its length or major horizontal axis which extends generally parallel to the concave and convex sides of the container. It is to be understood, however, that this invention is not limited to such containers, but broadly refers to any article that has a shape which is non-symmetrical about a vertical plane through its major horizontal axis.

In a specific embodiment of the invention, non-symmetrical upsstanding articles are fed to an article orienting station such as a corner formed by angularly disposed infeed and outfeed conveying means. A turret or like device is disposed over the corner and has four depending rods equally angularly spaced over the respective points of the corner. These rods extend toward the plane of the corner with their lower ends being spaced therefrom a distance substantially less than the height of any article arriving at the corner. The articles on the infeed conveyor are generally randomly oriented as to which of their sides faces the inside of the corner.

That specific embodiment of the invention is based on the fact first realized by applicant, taking as an example the specific convex-concave shaped article above described, that such a non-symmetrical article with the aid of the aforesaid depending rods at the corner, will automatically turn the corner when fed thereinto with its concave side facing the inside of the corner, but will proceed straight through the depending rods without turning the corner if the article as fed thereto has its convex side facing the inside of the corner. Means are provided, then, to sense the lack of turn of a corner by any one of the articles as fed thereinto, and this sensing means operates to rotate the depending rods as a unit to cause any improperly faced article to be rotated in an angular direction opposite to that of the turn of the corner by an amount which approximates the angle formed by the corner. This reorients that article so that its concave side faces, like the articles which automatically turned the corner, the inside of the corner as it exits therefrom on the outfeed conveyor.

Preferably, the corner above referred to is approximately 90°, but limitation thereto is not necessary. It may be a left-hand or right-hand corner, as desired. Further, though the foregoing indicates that the sensing means is disposed so as to sense the presence in said corner of an article which did not automatically make the turn around the corner, it it within the purview of this invention that the sensing means be disposed so as to sense the presence of an article that did make some turn in the article orienting station (whether at corner or not in the conveying line is immaterial in the broad sense), to effect rotation of the depending rods appropriately and cause that article in effect to be moved straight through the corner or station so that all articles exit therefrom with all convex sides facing in the same direction and moving in a direction which may be termed the corner "exit" direction though in this case the articles are actually leaving a simulated corner without having fully executed the turn therearound. Under such conditions, the outfeed conveying means is in alignment with the infeed direction and the article carrying plane at the corner need not be a full length conveyor but a rotating disc or only of such length as to aid in forming the simulated corner and movable at least partially transversely of the infeed direction.

Still a further and preferred embodiment of the invention eliminates any requirement for even a simulated corner and is suitable at any place along a straight conveyor, the convex or concave facing of the article being sensed thereat as by determining whether a reflected light beam is concentrated or scattered and the sensing being used to rotate depending members through which the containers pass. Preferably, this embodiment, and the others too, includes a retractable holder by which any article needing to be rotated is held in the rotating position.

It is therefore a principal object of this invention to provide apparatus for similarly orienting articles by sensing incorrect orientation and operating thereby an overhead rotation mechanism which has depending members that rotate the article.

Another object is the provision in the article orientation station of holding apparatus responsive to the sensing of incorrect orientation to confine the article in a rotating position.

Another object of this invention is to provide apparatus for similarly orienting articles, which upon arriving at an orienting station tend to turn a substantial angle if in a first orientation or proceed straight ahead if in another orientation, by overhead rotation of an article sensed in a given one of those orientations to effect the other orientation for all the articles as they leave the station.

Another object of this invention is to provide apparatus for similarly orienting the faces of non-cylindrical articles that have a shape which is non-symmetrical about a vertical plane through the major horizontal axis of the article, by sensing whether or not the article turns a corner to which it is fed and accordingly rotating only each article, which is not fed into the corner in a desired orientation, into a desired orientation so that all like faces of the articles leave the corner in the same general direction, the rotation of any improperly oriented article being effected by rotation of members depending over the corner in a direction opposite to the turning direction of the corner.

Other objects and advantages of this invention will become apparent to those of ordinary skill in the art upon reading the following detailed description in conjunction with the claims and drawings wherein:

As previously indicated, this description proceeds in reference to similarly orienting like faces of non-symmetrical articles of the bottle type which have one convex external side and an opposite concave external side. Such bottles are shown in the drawings by the reference character 10 (with and without post-designators such as the "a" of 10a, which indicate successive bottles or positions of the same bottle) for example as in FIGURES 1, 2 and 3. As may be noted particularly in FIGURE 1, the width of the bottles between the side guide rails 12 is smaller than the length of the bottle along its major horizontal axis 14, which in the case of bottle 10a is parallel to the bottle infeed direction indicated by the arrow 16. The bottles are moved in that direction by an infeed conveyor 18 which is appropriately moved by take-up driving means 20. The space between infeed conveyor 18 and outfeed conveyor 22, created by the fact that conveyor 18 returns to the driving means 20 before its carrying plane can come close enough to the outfeed conveyor 22, is filled by a dead plate 24. The inward movement of conveyor 18 places successive bottles onto the dead plate 24 while succeeding bottles push any bottle on that plate onto the outfeed conveyor 22. As may be seen in the respective side views shown in FIGURES 2 and 3, the corner formed by the infeed and outfeed conveying means has depending from an overhead rotatable device or turret 26 four equally angularly spaced members such as rods 28. These rods extend downwardly close to the plane of the carrying surface of conveyors 18, 22, and dead plate 24, but are not fastened thereto at their bottom ends. As illustrated, rods 28 clear the plane of the convexing surfaces a distance substantially less than the height of any bottle which approaches the corner. Additionally, these rods depend substantially over the points of the corner. As will be appreciated, the corner in the illustrations is a left-hand, right angled corner.

Figure 4:
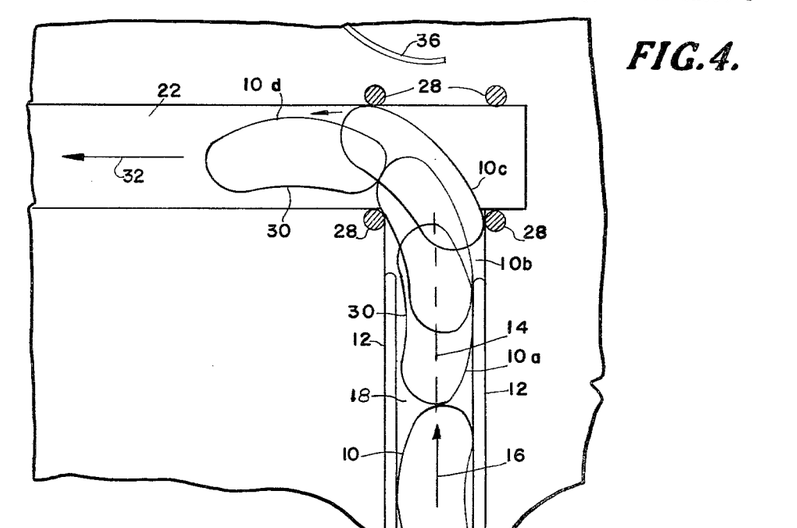
FIGURES 4, 5 and 6 are diagrammatic illustrations indicating principles of operation of the invention.
Figure 5:
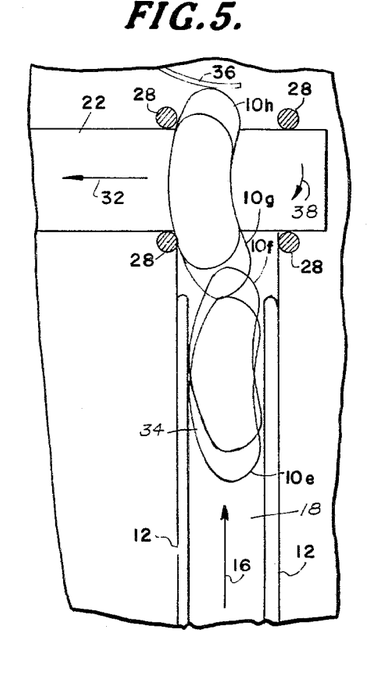
Figure 6:
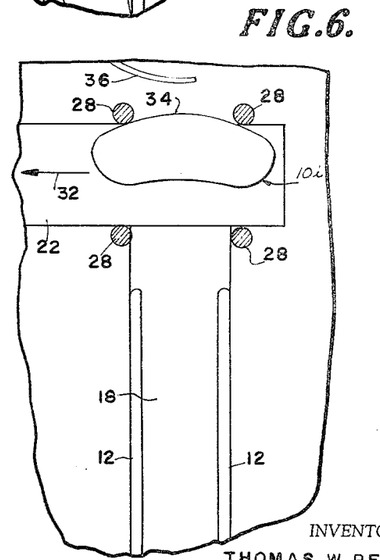

For purposes of greater appreciation of the invention, reference is now made to FIGURES 4, 5 and 6 which ilustrate the principles involved in this invention, in partial schematic form. In FIGURE 4, the four rods 28 are shown in one of their four possible angular positions, the other three positions being exactly the same as illustrated except that the respective rods are advanced 90° per position. It may be noted in FIGURE 4 that bottle 10a is approaching the corner on infeed conveyor 18 with its concave side 30 facing the inside of the corner. Bottle 10 due to the conveying action pushes bottle 10a onto the dead plate as previously explained, and further into the area of the corner. During this same time, the outfeed conveyor 22 is moving in the direction of arrow 32. As soon as the bottle reaches position 10b, the pulling movement of conveyor 22 draws the nose of the bottle in the direction 32. This action continues while the succeeding bottle pushes on the rear of the bottle in the corner until the latter bottle reaches position 10c at which point the opposite ends of its convex side touch the outer diagonally opposite ones of rods 28. Further movement of conveyor 22 pulls the bottle on around the corner into position 10d so that its concave side 30 faces the inward side of the corner as the bottle leaves the corner. It is apparent, therefore, that when the concave side of any bottle in its approach to the corner faces the inside of the corner, that bottle will automatically turn the corner without rotation of rods 28.

On the other hand, when a bottle approaches the corner, as shown in FIGURE 5, with its convex side 34 facing the inside of the corner, it is apparent by observation of the successive bottle positions 10e–h that the bottle does not turn the corner automatically as in FIGURE 4, but proceeds onwardly in the infeed direction 16. In so doing, it arrives at position 10h and intercepts switch arm 36. As will be later explained, the contact of the bottle with this switch arm effects actuation not only of a switch itself, but of other apparatus which causes rods 28 to rotate clockwise as indicated by arrow 38, an angle of 90°. This rotation is in an angular direction opposite to the counterclockwise turn of the corner, but in amount is substantially the same as the inside angle of the corner angle. The result of the turning of the rods 28 90° is that the bottle 10h is also rotated 90° clockwise to its new position 10i as shown in FIGURE 6, wherein it rests only on the outfeed conveyor 22. This places the convex side 34 of the bottle in the same facing direction on the outfeed conveyor as the bottle 10d of FIGURE 4, so both such bottles leave the corner with their concave sides facing the inside of the corner, notwithstanding the fact that the bottles approached the corner with their concave sides facing in opposite directions.

Figure 1:
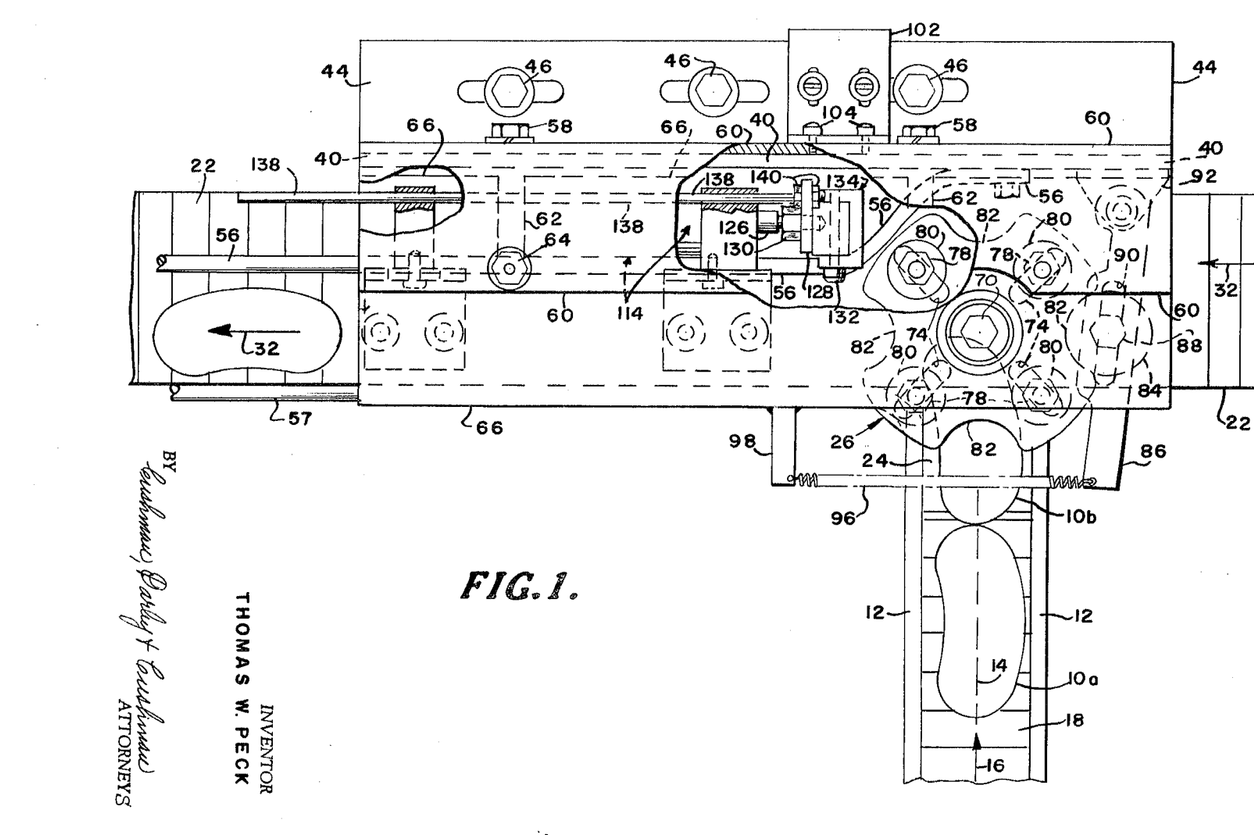
FIGURE 1 is a plan view of the apparatus.
Figure 2:
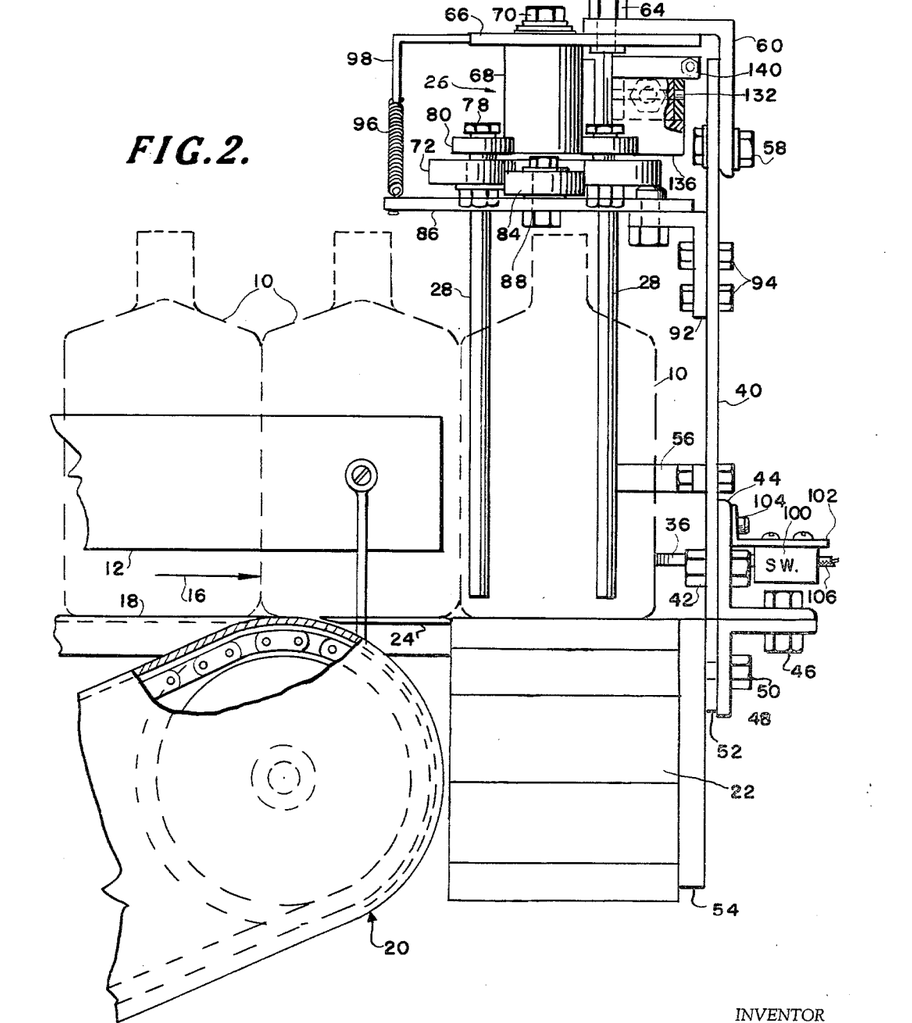
FIGURE 2 is a right side view.
Figure 3:
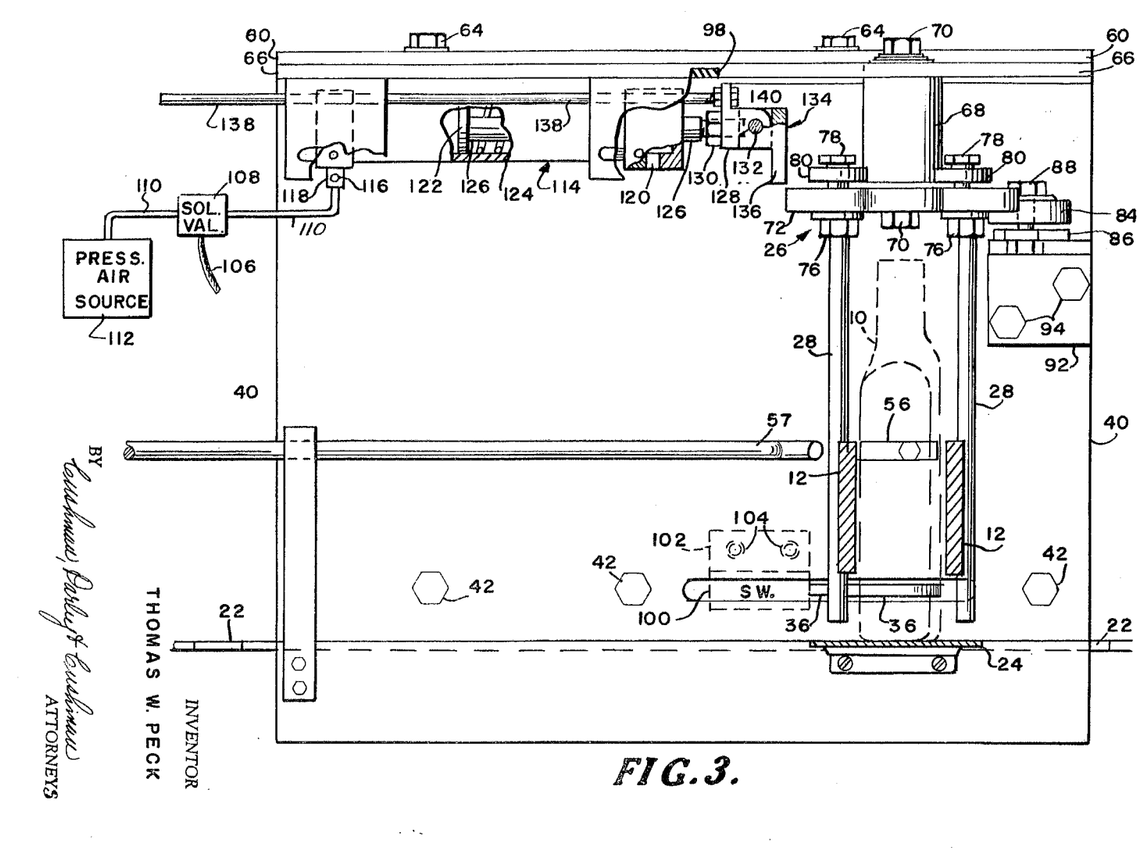
FIGURE 3 is an elevational view taken from the front or lower side of FIGURE 1.

Further details of the apparatus are now described with joint reference to FIGURES 1, 2 and 3. Upstanding back plate 40 is utilized to hold the equipment which appears overhead of the corner and generally above a part of the outfeed conveyor. This plate is secured by bolt means 42 to centering angle 44 which in turn is secured by other bolt means 46 to another right angled mounting bracket 48. The latter is attached by bolt means 50 to a plate 52 that is secured along the rear side of part of the length of the outfeed conveyor 22, for example to normal outfeed conveyor line structure 54, by any suitable means. Centering angle 44 extends the length of plate 40 and has a plurality, for example three, slots in its horizontal leg for receiving bolt means such as 46. These slots are of sufficient length to allow plate 40 and the equipment which it holds to be moved in either direction parallel to the outfeed conveyor, to a degree sufficient to effect the desired centering of depending rods 28. Further secured along the length of plate 40 is a rear guide bar 56 which acts in conjunction with guide rod 57 as the side guides for the bottles as they move along the outfeed conveyor. Secured near the top of plate 40, by bolt means 58 is another right angled mounting bracket 60 which has a plurality of slots 62 in its horizontal length for receiving bolt means 64 and effecting further centering of the overhead apparatus which is mounted on mounting plate 66. Bushing 68 in conjunction with bolt means 70 rotatably holds turret 26 to plate 66 by connection with the turret through an aperture in the center of turret disc 72. As is apparent from the drawings, each of the depending rods 28 extends through a respective, radially extending slot 74 in disc 72. Each of the rods 28 is threaded at its upper end and is held in a desired vertical position by underside nuts 76 and upperside nuts 78 in conjunction with bearings 80. These bearings are preferably rotatable about the longitudinal axes of the respective rods 28, for purposes below described, and may be ball bearing wheels. By virtue of slots 74, each of the wheels 80 and associated rods 28 may be adjusted radially, to effect the desired spacing between the rods to accommodate the particular size bottles being fed to the corner. The wheels 80 need not be adjusted for this purpose, but for convenience of attachment to disc 72 move with any radial adjustment of rods 28.

As will be noted particularly in FIGURE 1, the slots 74 are spaced at 90° around disc 72. In between these slots, and on the periphery of the discs at equal angular spacing, are four notches 82. Cooperating with these notches, as disc 72 rotates, is a bearing 84, which may also be a ball bearing wheel, that is rotatably secured to a locking plate or arm 86 by bolt means 88 in a wheel position adjusting slot 90. The rearward end of locking arm 86 is pivoted on a right angled mounting bracket 92 that is secured via its vertical leg by bolt means 94 to backing plate 40. The forward end of locking arm 86 is tensioned leftwardly, as viewed in FIGURE 1, by means of spring 96 the other end of which is attached to a right angled member 98 secured in any suitable manner to mounting plate 66. Therefore, as disc 72 rotates clockwise, by means described below, locking arm 86 and its indexing wheel 84 are caused to move rightwardly momentarily until the next notch 82 becomes adjacent wheel 84, at which time the latter moves into that notch and accurately indexes the depending rods 28 to the desired position therefor.

As previously explained in connection with FIGURES 5 and 6, any improperly oriented bottle, since it proceeds through the intersection of the conveyors without turning the corner, contacts switch arm 36. This arm is also illustrated in FIGURE 2, and as there shown extends through a horizontally elongated slot in plate 40 and centering angle 44 to a microswitch 100 which is mounted on bracket 102 secured to centering angle 44 by screw means 104. Upon contact between a bottle and switch arm 36, the latter effects actuation, i.e., closure, of microswitch 100 to energize its output lead 106. This lead, as shown in FIGURE 3, extends to a solenoid operated air valve 108, which is disposed in the air conduit 110 between a pressurized air source 112 and the inlet port of an air cylinder 114. Coupling of the conduit 110 to the inlet port of the cylinder may be through a fitting 116 which has a small exhaust hole 118. At the opposite end of cylinder 114 is a larger exhaust aperture 120. Piston 122 is normally biased leftwardly, as viewed in FIGURE 3, by means such as compression spring 124.

Upon energization of solenoid valve 108, pressurized air is released from source 112 into the left end of cylinder 124, pushing piston 122 rightwardly against the compression of spring 124 and moving the external end of piston rod 126 rightwardly.

The right hand or external end of piston rod 126 is threaded and pawl mount 128 is screwed thereonto, as is locking nut 130. Hingedly mounted by pin or bolt 132 on the forward part of mount 128 is a pawl 134. As may be noted in FIGURE 1, this pawl is of U-shaped configuration with the hinge means 132 extending through both legs of the U. In FIGURE 3, it will be seen that pawl 134 has a depending member 136. It is this depending member which pushes against the most adjacent wheel 80 when piston rod 126 moves rightwardly. The rightward travel of the piston rod and pawl 134, once the latter comes into contact with that wheel 80, causes disc 72 to rotate clockwise, and the pawl travel is sufficient to rotate the disc approximately 90° so that upon cessation of rightward movement of the pawl the indexing wheel 84 due to the bias of spring 96 continues rotation of the disc the necessary amount to effect full 90° rotation thereof.

Upon de-actuation of microswitch 100 and consequent closing of solenoid valve 108, no further pressurized air is allowed to pass therethrough into cylinder 114. This allows piston 122 to return to its normal retracted position under the then expanding action of spring 124, while the pressurized air in the inlet end of the cylinder escapes through hole 118. The larger aperture 120 in the opposite end of the cylinder provides continual venting of that end of the cylinder to atmospheric pressure.

During the return of the piston 122 to its normal position, pawl 134 is pulled leftwardly by piston rod 126 and pawl mount 132. In its leftward line of travel, however, the depending member 136 of the pawl finds another wheel 80 which would either prevent return of the pawl or rotate disc 72 counterclockwise, either of which would be undesirable. This points to the reason pawl 134 is hinged to its mount 132 with the upper right corner (FIGURE 3) of the mount being rounded so that the pawl can be lifted in a counterclockwise direction by wheel 80 and prevent either of those undesirable situations from occurring.

Since there may be some tendency of piston rod 126 to bend or twist upon recurrent operation of pawl 134 against successive wheels 80, pawl mount 128 is provided with an aperture through which extends a strengthening guide rod 138. This rod is threaded on its pawl mounting end and secured to the mount by nuts 140. In addition, rod 138 extends through apertures in the casing at each end of cylinder 114, with the extension of the rod leftwardly of the left end of cylinder 114 being sufficient to maintain the rod within the left end clearance hole of the casing when piston rod 126 is at its full rightward travel.

Though cylinder 114 is above indicated as being pneumatically operated, it is apparent that any other fluid may be utilized to effect the desired ends. Further, the switch actuation means has been described as an arm extending into the pathway of an improperly oriented bottle so as to be intercepted or contacted thereby. Any other type actuating means including a mechanically operating arm coupled to an electrical switch or a photoelectric light beam interception principle may be utilized instead to effect control of the solenoid air valve. As another alternative to the specific embodiment above described, dead plate 24 may be eliminated, thus removing its frictional results to the motion of the article thereacross, and replaced by means of a rotating disc which assists in the transverse of the articles from the infeed conveyor through the corner to the outfeed conveyor. Such a disc may be rotated by means of a belt and pulley arrangement connected to the infeed conveyor. The further embodiment described below utilizes these and other modifications.

Relative speeds of the infeed and outfeed conveyors make little difference in the operation of the apparatus as long as the outfeed conveyor operates fast enough to empty the corner of a bottle before the next bottle is admitted, but even this limitation is not strictly necessary if an incoming article stopper is employed as in the embodiment below. The rate of flow of the bottles on the infeed conveyor should not exceed the maximum working rate of the turret. The usual working rate thereof is approximately 45 bottles per minute, though the apparatus described has properly handled bottles in surges of approximately 65 per minute. Generally, the incoming rate may be quite random.

With the operation of the apparatus described, a few comments may be made as to the purpose of desiring identical orientation of the bottles, that being to allow any desired one of numerous possible subsequent operations to be automatically performed on the desired face or faces of the bottles. Such operations may include gaging of any physical dimension of the bottles (for example the size of the opening at the top thereof) or filling, labeling, capping, or packaging operations for example.

In the embodiment now to be described, the general operation is similar to that above indicated for the embodiment of FIGURES 1–6 but certain modifications are made to effect a preferred type of orienting apparatus. Where feasible, numerals previously used are hereafter used to represent the same item.

Figures 7, 11:
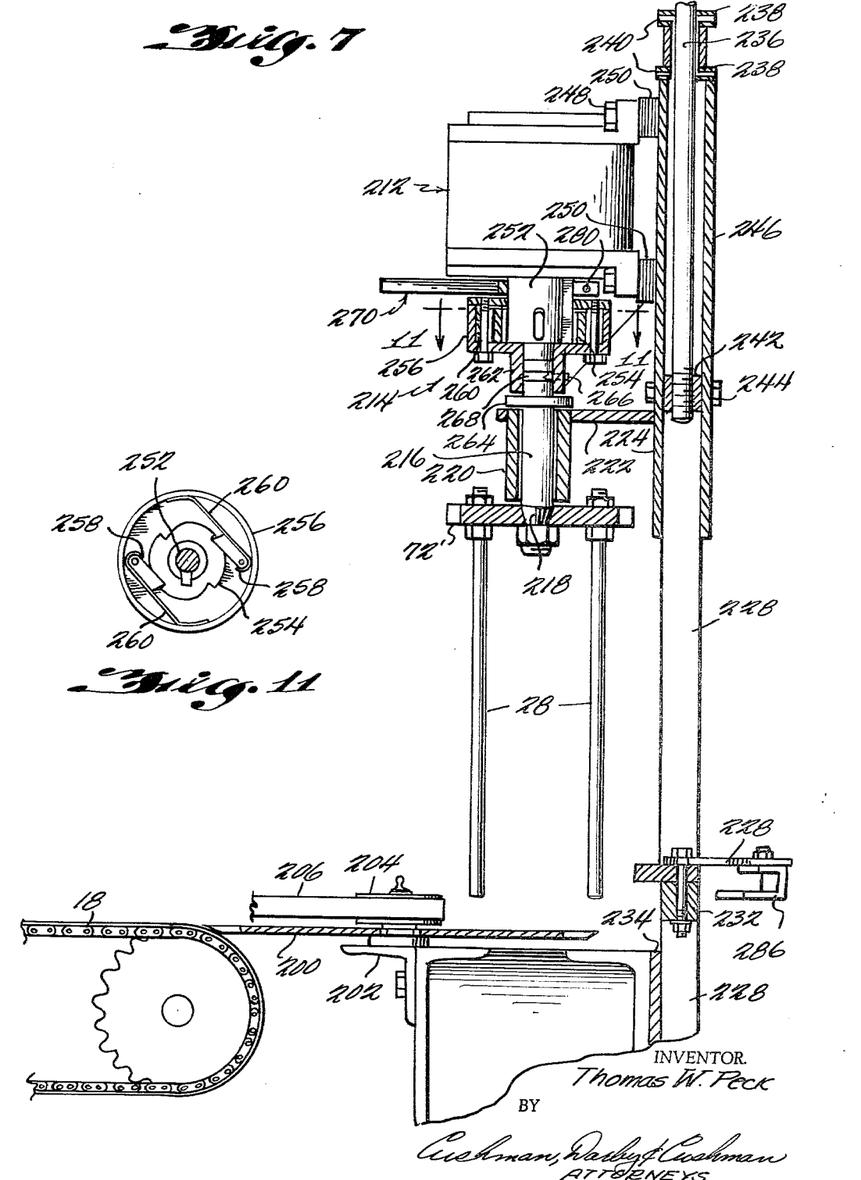
FIGURE 7 is a cross-sectional side elevational view of a second embodiment of the invention.
FIGURE 11 is a cross-sectional view of the ratchet mechanism taken approximately along the line 11—11 of FIGURE 7.
Figure 8:
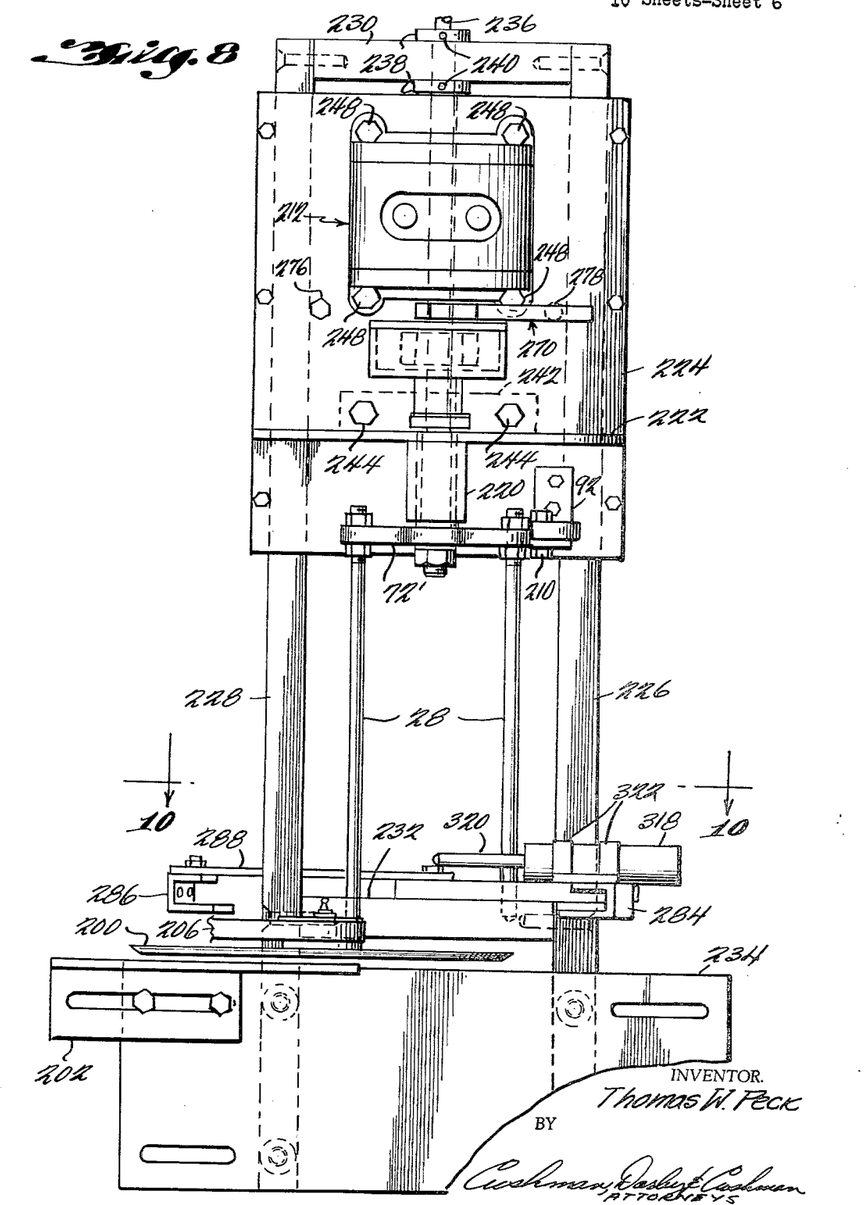
FIGURE 8 is a front elevational view of the second embodiment without the infeed and outfeed conveyors.
Figures 9, 10:
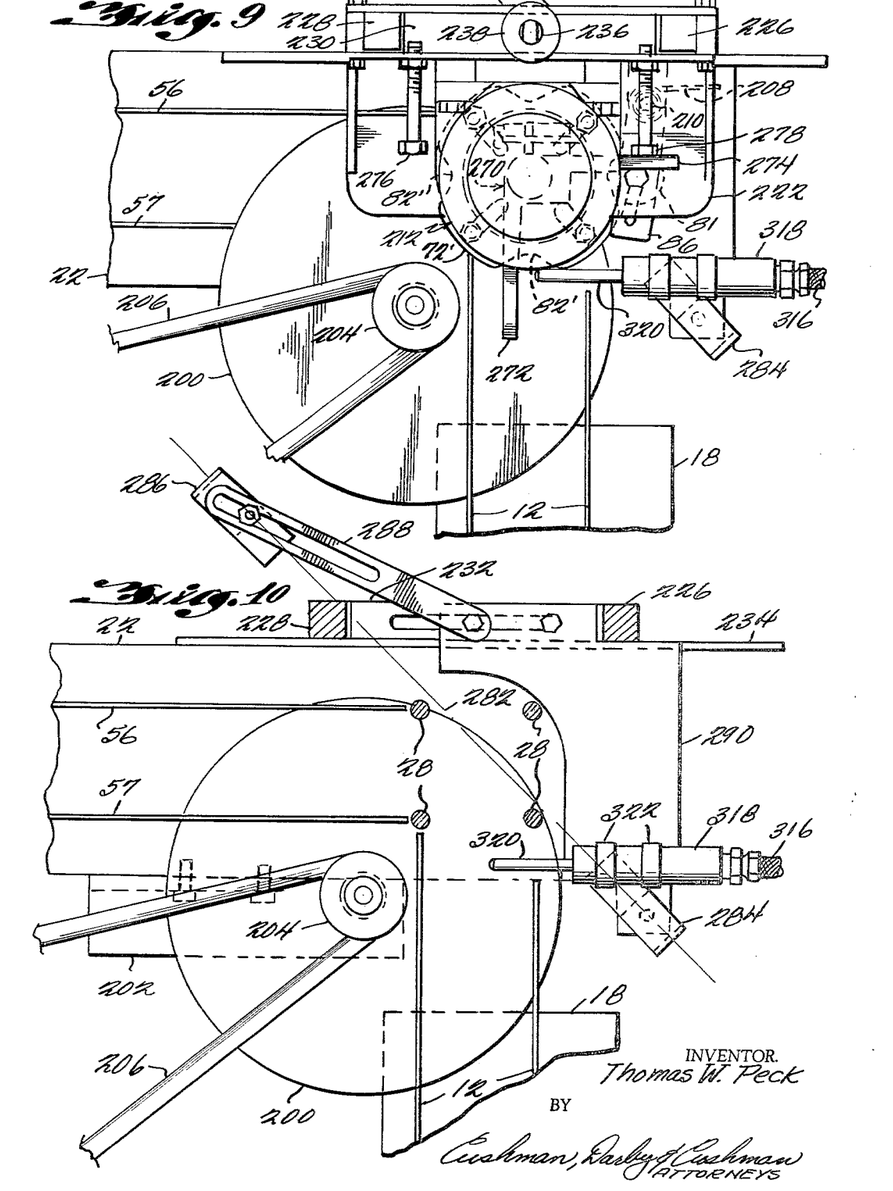
FIGURE 9 is a top plan view of the second embodiment.
FIGURE 10 is a cross-sectional view taken approximately along the line 10—10 of FIGURE 8.

As may be appreciated by reference to FIGURES 7 and 8, in conjunction with the plan view of FIGURE 9 and the cross-sectional view shown in FIGURE 10, the present embodiment also employs four depending turret members such as rods 28 which respectively point to the corners of the corner formed at the junction of infeed conveyor 18 with its guide rails 12 and the outfeed conveyor 22 and its guide rails 56 and 57. Instead of a dead plate at the junction of these conveyors, the present embodiment employs a relatively large diameter disc 200, which is suitably secured by bracket 202 to the outfeed conveyor frame, and continuously driven via pulley 204 and belt 206. This driving system may be connected with the infeed conveyor drive, as desired. The purpose of disc 200 is to assist in transferring the ware or article from the infeed conveyor to the outfeed conveyor and particularly to impart controlled motion to the bottles or other type ware or articles being conveyed through the orienting station. Therefore, the article carrying means, which is a part of the corner forming means, includes the rotating disc 200 in this embodiment. As is apparent the top surface of the disc 200 is coplanar with the top surface of the infeed conveyor 18. This is desirable, if not necessary, to attain proper transfer of the articles from the infeed conveyor to the disc, and it is possible for the top surfaces thereof to be co-planar since the infeed conveyor curves downwardly about the conveyor and shaft without interfering with the vertical thickness of the disc. Transfer of articles from the rotating disc 200 to the outfeed conveyor 22 is accomplished in a different manner, however. During this latter transfer, the articles must drop from the rotating disc 200 to the outgoing conveyor 22, since it is desirable to maintain the surface of the outgoing conveyor horizontal and parallel with the disc surface. Even when the articles being transferred are bottles the drop from the disc to the outfeed conveyor is not disadvantageous since the amount of drop is normally rather slight, say 3/16", for example 1/8" thickness for the disc plus a slight clearance thereof over the outgoing conveyor. It is to be understood that use of such a disc is not essential to this invention, but is highly preferred as an aid in moving the articles being oriented, round the corner, and this it does in a more smooth and gentle manner than may be the situation when no such disc is employed. The disc rotates continuously as above indicated, meaning that even while an improperly oriented article is being reoriented, there is sliding contact between the article and the smooth surface of the disc.

The depending turret rods 28 are fastened at their upper ends to a turret disc 72'. Generally speaking, this disc is the same as its counterpart in the first described embodiment above, but in the present embodiment the depressions or notches 82' (see FIGURE 9) are shallower, allowing the cooperating ball bearing wheel 84 to go into and out of the depressions more gently thereby permitting more gentle turning of the depending turret rods 28 and the glass or other type articles which they reorient. In FIGURE 9 it will be noted that the ball bearing wheel 84 is still rotatably and adjustably secured in a locking plate or arm 86', but this arm now has no forward spring connection as does its counterpart in FIGURE 1. Instead, a torque spring 208 is attached to the locking plate lever pivot bolt 210.

Instead of employing a single acting air cylinder 114 as in FIGURE 1, with its piston rod pushing on ball bearing wheels to turn the turret 90°, the present embodiment utilizes a fluid operated rotary type actuator which is reversible in angular direction in response to change of fluid pressure direction. This rotary actuator 212 is slip coupled to turret disc 72', as by ratchet mechanism 214. The indexing shaft 216 which extends upwardly from turret disc 72' to which it is secured by key 218 rotates on a bushing in collar 220. This collar is secured by horizontal bracing 222 to an upright plate 224. As shown particularly in FIGURE 8, there are two upright rods or poles 226 and 228 which are maintained horizontally apart by a top spacer 230 and a bottom spacer 232. These uprights are in turn secured to a general mounting plate 234 which is secured, as indicated in FIGURE 7, to the outfeed conveyor frame. At the top, at a point midway between uprights 226 and 228, is an adjusting screw 236 which is secured to the spacer 230 by collars 238 and their respective pins 240 to prevent vertical movement of the adjusting screw 236 when it is turned clockwise or counterclockwise. At its lower end, adjusting screw 236 threadedly engages a lift bar 242, which on its front face is secured to plate 224 by bolts 244, as shown in FIGURE 8, and these bolts continue through bar 242 to hold the clamping plate 246 against uprights 226 and 228.

At the upper ends of front and back plates 224 and 246 is secured the rotary actuator 212 as by four bolts 248, washers 250 or the like being utilized to effect a desired amount of spacing in order to position the depending turret rods 28 properly in the frontward-backward direction. Actuator 212 has an output shaft 252 which is rotatably secured to a ratchet pinion 254 (see FIGURE 11). This pinion is in turn slippingly secured to the ratchet housing 256 via the two pawls 258 and their respective tension springs 260. As will be noted in FIGURE 7, housing 256 has a reduced diameter neck 262, which threadedly engages the upper end of indexing shaft 216. The lower end of the housing shaft neck 262 may rest directly, or indirectly via a washer or the like, on a shoulder 264 of the indexing shaft 216, with the shaft being vertically fixed relative to neck 262 by virtue of a set screw 266 protruding into groove 268 at the upper end of the indexing shaft. It will be appreciated that whenever the actuator output shaft 252 rotates clockwise, housing 256 will also rotate clockwise and carry indexing shaft 216 with it, and consequently turret disc 72' will likewise rotate clockwise. On the other hand, when actuator shaft 252 rotates counterclockwise, pinion 254 will not catch the pawls 258 in such a way as to cause the housing 256 to rotate at all, so turret disc 72' will not rotate counterclockwise when the actuator output shaft so rotates.

Between the housing of the actuator 212 and the housing of the ratchet mechanism 214, there is disposed a double armed stop 270, the two arms 272 and 274 of which, as shown in FIGURE 9, are so disposed as to hit against respective stop bolts 276 and 278 upon rotation of actuator shaft 252 approximately 90° in either direction. These bolts 276 and 278 are adjustable so that the arms 272 and 274, as secured to actuator output shaft 252 in a clamping manner by use of screw 280, prevent the turret from rotating more than approximately 90° in a clockwise direction when the actuator is energized clockwise. When the actuator is energized in a counterclockwise direction, it returns 90° and stops, but this reset of the actuator does not turn the turret, of course, because of the presence of ratchet mechanism 214.

From all the foregoing, it will now be appreciated that adjusting screw 236 may be employed to adjust the distance the lower ends of depending rods 228 are above the surface of disc 200, since rotation of the adjusting screw will vary the height of the lifting bar 242 to which is secured the front plate 224 that in turn carries the actuator 212 as well as the parts which couple the actuator to the turret with a fixed vertical relationship.

It will be recalled that in the embodiment above described relative to FIGURES 1–6, sensing of an improperly oriented article was accomplished by the article making contact with the actuating arm of microswitch. In the present embodiment, instead of employing such a sensing means, there is utilized a beam of energy which upon being interrupted by an improperly oriented article causes reorientation thereof by the rotary actuator 212. In FIGURE 10, this energy beam is indicated by the numeral 282. Although the beam may be of any type energy desired, for practical purposes it generally is a light beam, which is directed diagonally across the outer half of the corner, for example at an angle of 45° to 55° to the infeed or outfeed conveyors. The beam of light may be derived from any suitable source, and collected by any suitable light sensitive means. The light source and collector are secured to brackets 284 and 286 both of which are adjustable in angle, the latter via arm 288 which is in turn secured to mounting bracket 290. This bracket is adjustably affixed to the lower spacer 232 so that its inner arcuate contour will just clear the depending rod 28 as they turn, and this inner edge of the mounting bracket 290 may be utilized to guide bottles through the corner.

Figure 12:
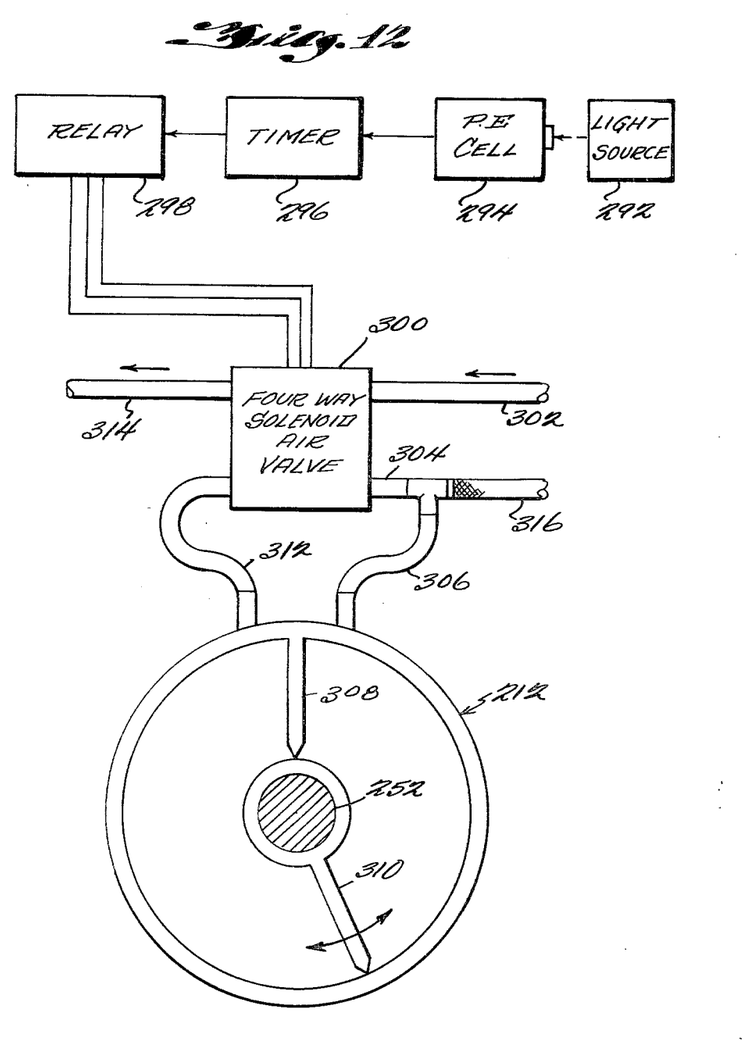
FIGURE 12 is a schematic illustrating electrical and pneumatic circuits for the second embodiment.

As shown in FIGURE 12, a suitable light source 292 cooperates with a desired light sensitive means such as a photoelectric cell 294 the output of which is coupled to a timer 296 to cause relay 298 to effect either one of two given fluid flow paths through the four-way solenoid air valve 300. For example, pressurized fluid, such as air, may be caused to follow a pathway through valve 300 from the input conduit 302 to conduit 304 whenever the source of light to the photoelectric cell 244 is interrupted. Under such circumstances, the fluid under pressure is directed via conduit 306 into the right-hand pneumatic chamber inside rotary actuator 212. As is schematically indicated, there is a stationary vane 308 within actuator 212 and a movable vane 310 which is secured to the actuator output shaft 252. When pressurized air is forced into the right-hand chamber of the actuator, vane 310 is caused to move clockwise, thereby turning shaft 252 and decreasing the size of the left-hand chamber. The fluid in this left chamber is consequently forced out of the actuator via conduit 312 and valve 300 to the exhaust conduit 314. After a predetermined length of time, determined by timer 296, relay 298 unlatches and energizes the solenoid of valve 300 in an opposite direction so as to interchange the functions of conduits 306 and 312. This means that the pressurized fluid which enters the valve from conduit 302 is directed into the actuator through the conduit 312 instead of conduit 306. Accordingly, the reversed pressure on vane 310 pushes the vane counterclockwise which in turn makes the fluid exhaust via conduits 306 and 314. Though vane 310 has ability within the actuator to rotate approximately 280°, rotation thereof and of shaft 252 is of course limited in the clockwise and counterclockwise directions to approximately 90°, by virtue of the double-armed stop 270 previously discussed. And it will also be recalled that only the clockwise rotation of the vane 310 causes movement of the turret and consequently reorientation of an improperly oriented bottle or other article, the return of vane 310 being ineffective to rotate the turret counterclockwise due to the slipping action operative in the ratchet mechanism 214.

In FIGURE 12 it may be also noted that the valve conduit 304 connects to a further conduit such as a flexible tube 316. In FIGURES 9 and 10 this flexible tube is connected to a cylinder 318 that has at its opposite end a piston rod 320. This cylinder is secured by clamps 322 to bracket 290, and it is of the single acting, spring return type. The purpose of this cylinder and its rod 320 is to add a ware stop mechanism which is pneumatically actuated when the light beam is interrupted to prevent any bottle or other article from entering the corner while an article therein is being reoriented. This prevents any approaching bottle from interfering with the bottle being oriented. Since the rate of feed of articles coming into the orienting station is random so that sometimes there is no spacing between successive articles and at other times up to three or four feet may intervene, piston rod 320 variously acts to biasingly press against any bottle or article which is about to enter the corner too quickly or completely interposes itself between successive articles according to their distance apart. From FIGURE 12, it will be appreciated that the ware stop plunger 320 is operated for roughly the same period of time that the rotary actuator is operated, but since the ware stop cylinder 318 has lower mechanical inertia than the rotary actuator 212, any approaching ware is always stopped slightly before the rotary actuator begins to turn.

As previously indicated the improvements in the embodiment shown in FIGURES 7–12 over the embodiment in the earlier figures are not absolutely essential to effect efficient operation of the apparatus. However, the improvements described for the latter embodiment are particularly desirable since they are directed toward faster and more uniform flow of glass containers or other types of articles through the orienting station, toward more gentle turning action to avoid bruising the ware, and toward greater dependability in the operation of the indexing device.

Figure 13:
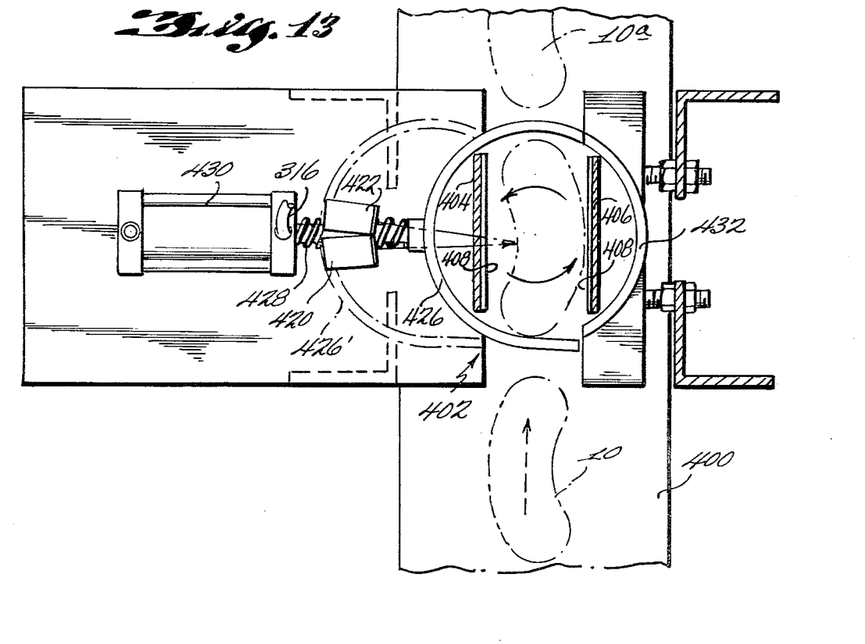
FIGURE 13 is a view of a further embodiment taken along the line 13—13 of FIGURE 14.

A still further preferred improvement is illustrated by the embodiment shown in FIGURES 13–16, in which the conveyor line or belt 400, as seen in plan view in FIGURE 13, is straight and does not need to form a corner at the article orientation station 402, as was preferable in some of the previous embodiments. An article orientation station which can be utilized on a straight portion of a conveyor is generally preferred because it may be located more readily and conveniently at any desired place along the line since a 90° intersection or the like of two conveyors is not necessary.

Figures 14, 15:
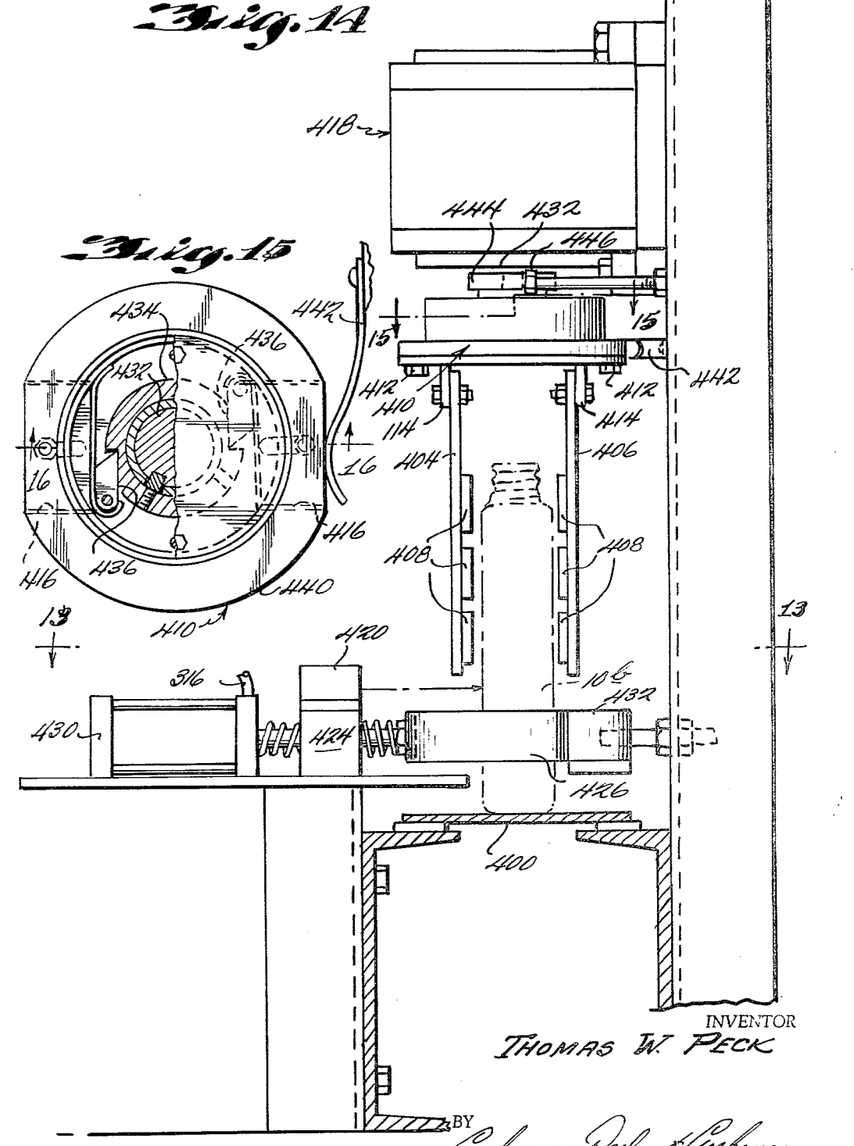
FIGURE 14 is a cross-sectional side elevational view of a preferred embodiment.
FIGURE 15 is a view taken along the line 15—15 of FIGURE 14.
Figure 16:
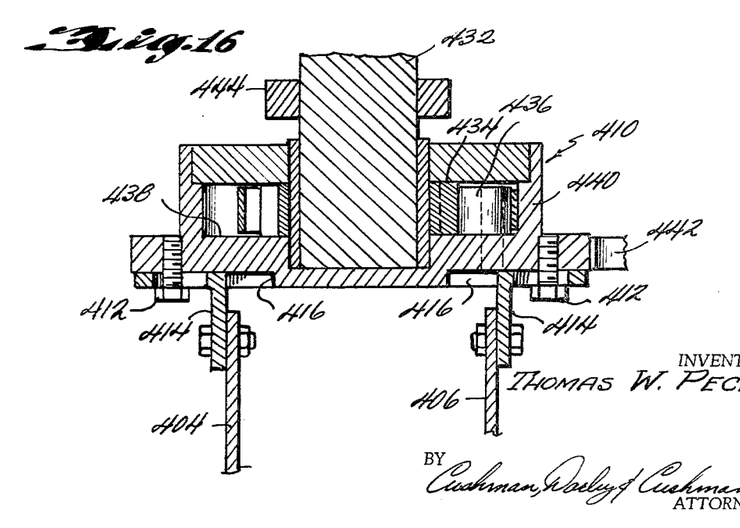
FIGURE 16 is a partial cross-sectional view taken along the line 16—16 of FIGURE 15.

In FIGURES 13–16, the concave-convex articles or glass flask-like containers 10 may arrive at the orienting station 402 on conveyor 400 with either their concave side or convex side facing a given direction. In the example illustrated in FIGURE 13, the desired orientation of an article 10 is such as that shown by article 10a, which is leaving the orienting station, while the undesired orientation of article 10b is sensed and corrected at the orientation station. As shown in FIGURES 13 and 14, an article or container 10b moves into the orientation station 402 between two spaced parallel depending members 404 and 406, which are preferably suitably padded on their inner sides by one or more strips 408 of Teflon or the like to prevent the container from being scratched or bruised. These depending members may be variably spaced since they are each adjustably secured to the bottom of a ratchet assembly 410, as by bolts 412 and mounting angles 414 which have an elongated slot in their horizontal member to effect radial adjustment of depending members 404 and 406. These mounting angles are secured in a groove 416 on the underside of ratchet assembly 410, thereby maintaining the depending members parallel. As in a previous embodiment, ratchet assembly 410 is coupled to a rotary actuator 418, which upon receiving an appropriate signal causes the depending members 404 and 406 to turn the container 180°.

The signals for operating rotary actuator 418 are obtained, in the embodiment of FIGURES 13–16, from an energy generating system such as light source 420 and a light sensitive receiver or detector 422. Both light source 420 and detector 422, which may be a photoelectric cell, are positioned at a relatively low level, such as atop a bracket 424 (FIGURE 14), in order to allow light to be directed underneath the lower end of depending member 404 but above a holding or confining type retractable positioning element or circular segment 426.

Normally, element 426 is retracted to the position shown in dotted line 426' by air pressure in line 316 from FIGURE 12, compressing spring 428. As an article enters the orientation staiton 402, light from source 20, for example a restricted or masked beam which is one-half inch wide and one-sixteenth inch tall, strikes the entering container. If the convex or outwardly bowed characteristic of a side wall of the container faces the beam of light, the cylindrical convexity thereof reflects the light energy as a very wide, low intensity signal, thereby causing no response from the light detector or photocell 422. Consequently, confining ring segment 426 is maintained in its retracted position 426' and the article is allowed to continue to be conveyed downstream uninterrupted.

On the other hand, when the cylindrical concavity characteristic of a container 10b concentrates the light source beam onto the detector 422, i.e., when the concave side wall of an article converges the light rays incident upon it back as a narrow, high intensity, almost pointed beam to detector 422, the detector operates in a manner similar to that previously described relative to FIGURE 12. In the present embodiment the detection of the concentrated beam of light by detector 422 operates to start timer 296 in FIGURE 12, thereby effecting air pressure in line 314 and consequently causing operation of rotary actuator 418 through a 180° turn. The signal from light detector 422 also releases air pressure in line 316 in FIGURE 12, which in FIGURE 13 is applied to air cylinder 430. The released compression of spring 428 then in turn forces confining ring segment 426 forward to act, in conjunction with the partial ring 432, as a holding means for container 10b while it is being rotated 180° by depending members 404 and 406. Air cylinder 30 and positioning ring 426 are of lower mass than the container rotating mechanism which is also operated as shown in FIGURE 12 by the valve 300, and therefore the positioning ring traps the container in the rotating position before the rotary actuator 418 can cause depending members 404 and 406 to rotate. At the end of the time determined by timer 296 in FIGURE 12, positioning ring 426 is retracted, container 10b as re-oriented moves downstream, and rotary actuator 418 returns its shaft 432 180° (clockwise in FIGURE 15) to its initial position, carrying ratchet 434 with it against two spring biased dogs 436. Depending members 404 and 406, however, remain in their rotated position by virtue of dogs 436 pivoting on the ratchet assembly floor 438. This prevents rotation of ratchet body 440, which is detented on one or the other of its flat sides by leaf spring 442.

The present ratchet assembly 410 compared to the previous ratchet assembly in FIGURE 7 eliminates the necessity of a bearing and mount attached to the frame of the device, and allows the two guide plates 404 and 406 and mounting angles 414 to be attached directly to the ratchet body, thus making the present ratchet assembly fewer in parts and more compact. An arm 442 clamps to the shaft 432 of rotary actuator 418, and cooperates with two adjustable stops 446 attached to the frame for limiting the amount of shaft rotation in both directions to approximately 180°.

It may be noted that depending members 404 and 406 serve two functions. Being parallel, and nominally in the same planes respectively with the incoming and outgoing conveyor guide rails (not shown), depending members 404 and 406 guide each container 10 through the orienting station whether or not the container requires turning, which function they also effect when reorientation is determined necessary.

The embodiment of FIGURES 13–16 obviates possible problems with the FIGURES 7–12 embodiment which may be inconsistent in its ability to sense orientation of the containers if there are slight differences from container to container in the physical shape and in the surface friction properties thereof. Furthermore, the provision in the FIGURES 13–16 embodiment of a means including retractable circular segment 426, for holding a container while it is being properly reoriented, allows accurate positioning of the container during rotation, which may not occur with the four depending rods in the FIGURES 1–12 embodiments when no such holding or positioning means is used therewith. Of course, such means may be added thereto as desired.

Thus, there has been described exemplary apparatus for providing all of the objects and advantages herein mentioned. Modifications other than those specifically mentioned will become apparent to those of ordinary skill in the art after reading this disclosure. Therefore the above specification is to be considered exemplary and not limitative, the scope of this invention being defined by the appended claims.

What is claimed is:

1. Apparatus for similarly orienting articles the shape of each of which is non-symmetrical about a vertical plane extending through the major horizontal axis of the article comprising means forming a corner including article infeed conveying and guide means for bringing said articles to said corner with their said major horizontal axes being at least generally in the infeed direction, said corner forming means further including article carrying means movable transversely of said infeed direction, a rotatable device disposed over said corner and having a plurality of angularly spaced depending members between at least some of which said articles move while in said corner, any said article arriving at said corner via said conveying means, while said rotatable device is non-rotating, automatically (A) turning said corner, or
(B) proceeding through said depending members without turning said corner according to which side of the article faces the inside of the corner in its approach thereto, and means including means for sensing any article executing a given one of (A) and (B), for rotating the rotatable device and effectively causing that article to execute the other of (A) and (B).

2. Apparatus for similarly orienting upstanding articles the shape of each of which is nonsymmetrical about a vertical plane extending through the major horizontal axis of the article comprising means forming a corner including article infeed conveying and guide means for bringing said articles upstanding to said corner with their said major horizontal axes being at least generally in the infeed direction said corner forming means further including article carrying means movable in the turned direction of said corner, a rotatable device disposed over said corner and having a plurality of angularly spaced depending members between at least two of which may be an article when fed as aforesaid to said corner, said article carrying means when moving as aforesaid and said depending members between at least two of which may rotating being effective to cause any said article arriving at said corner via said conveying means to automatically (A) turn said corner, or
(B) proceed through said depending members without turning said corner according to which side of the article faces the inside of the corner in its approach thereto, and means, including sensing means, for causing said rotatable device to rotate an article in an angular direction opposite to that of the turn of the corner by an amount approximating the inside angle of the corner upon sensing of the article executing one but not the other of (A) and (B) to effect the said other thereof.

3. Apparatus for similarly facing upstanding articles each of which has a generally concave external side and an opposite generally convex external side separated by the major axis of the article comprising means forming a substantially right angled corner including article infeed conveying and guide means for bringing said articles upstanding to said corner with their said major horizontal axes being substantially parallel to the infeed direction of the articles, said corner forming means further including article carrying means substantially coplanar with said conjveying means and movable in the turned direction of said corner, a rotatable device spacedly disposed over said corner and having four substantially equally angularly spaced members depending respectively towards the points of said corner to a distance from the plane of said conveying and carrying means less than the height of said articles, any said articles arriving at said corner via said conveying means, while said rotatable device is non-rotating, automatically (A) turning said corner when the said concave side of that article faces the inside of said corner, or
(B) proceeding through said depending members without turning said corner when the said convex side of that article faces the inside of said corner, and means, including sensing means, for causing said rotatable device to rotate an article substantially 90° in an angular direction opposite to that of the turn of the corner upon sensing of the article executing one but not the other of (A) and (B) to effect the said other thereof.

4. Apparatus as in claim 3 wherein said article carrying means includes an outfeed conveyor and said sensing means senses execution of (B) and causes the rotatable device to rotate as aforesaid each article whose convex side faces the inside of the corner in its approach thereto so that all articles leave said corner with their concave side generally facing the inside of said corner.

5. Apparatus as in claim 3 wherein said sensing means includes switching means and actuation means therefor disposed to be intercepted by an article executing the said one of (A) and (B), said switching means being coupled to said rotatable device for effecting the aforesaid rotation thereof when actuated by said actuation means.

6. Apparatus as in claim 5 including a pressurized fluid operated cylinder having a piston rod to an external end of which is coupled means for turning said rotatable device approximately said 90° upon being fluid operated, a source of pressurized fluid, said switch means being coupled to said source to effect the aforesaid operation of said piston rod when said switch means is actuated by said actuation means, and means for indexing said depending members of the rotatable device substantially at said corner points following rotation of the rotatable device by said turning means.

7. Apparatus as in claim 6 wherein said article carrying means includes an outfeed conveyor and said sensing means senses execution of (B) and causes the rotatable device to rotate as aforesaid each article whose convex side faces the inside of the corner in its approach thereto so that all articles leave said corner with their concave side generally facing the inside of said corner.

8. Apparatus for similarly facing upstanding articles each of which have opposite external sides that are convex and concave respectively comprising an infeed conveying and guide means and at right angles thereto outfeed conveying and guide means forming with the indfeed means a right angled corner, said infeed and outfeed guide means being effective to maintain said articles with their said sides facing the guide means, said infeed conveying means being effective to bring said articles upstanding to said corner in abutting relationship, there being a dead plate between said infeed and outfeed conveying means co-planar therewith with the action of the infeed conveying means being such as to cause the succeeding articles to push each prior article onto said dead plate and into said corner, said outfeed conveying means being movable in the exit direction of said corner, a turret spacedly disposed over said corner and having four equally angularly spaced rods depending substantially over the corner points respectively with the lower ends of said rods being vertically spaced from the plane of said outfeed conveying means a distance less than the height of any of said articles, said outfeed conveying means when moving as aforesaid and said depending rods when said turret is stationary being effective to cause any said article arriving at said corner via said dead plate to automatically (A) turn said corner if the article has its said concave side facing the inside of said corner in its approach thereto, or
(B) proceed through said depending rods without turning said corner if the article in its approach thereto has its said convex side facing the inside of the corner, said turret including a disc having four notches disposed about its periphery at equal angular spacings with said rods being secured to said disc at their upper ends respectively in the spacings between said notches, said turret being rotatably mounted, there being spring loaded means cooperable with any one of said notches to effect accurate indexing of said disc and depending rods, four bearing means secured atop said disc respectively over the positions of said rods, a pressurized fluid operated cylinder having a piston rod to an external end of which is hingedly secured a pawl, said cylinder being so mounted adjacent said bearing means that upon operation of the cylinder said pawl pushes against the then nearest one of said bearing means to cause said disc and depending rods to rotate approximately 90° in an angular direction opposite to that of the turn of the corner to allow said indexing means to cooperate with a succeeding one of said notches and accurately dispose said depending rods as aforesaid, a source of pressurized fluid, means including a switch coupled to said source to release pressurized fluid therefrom into said cylinder to cause the aforesaid operation thereof while said switch is actuated, switch actuation means coupled to said switch for sensing an article executing (B) whereupon said turret is caused to rotate as aforesaid and effect the re-orienting of all rotated articles with their concave sides generally facing the inside of said corner as they exit therefrom on said outfeed conveying means so that all convex article sides on the outfeed conveying means are in the same direction, said sensing means being effective upon rotation of said turret to de-actuate said switch which in turn effects cut off of the pressurized fluid supply to said cylinder, said cylinder having pressurized air escape ports and spring return means to cause said piston rod and pawl to be retracted, the said hinging of the pawl being effective during the retraction of the pawl to prevent rotation of the turret in the same angular direction as the turn of said corner.

9. Apparatus as in claim 8 wherein said sensing means includes an arm extending from said switch into an area adjacent said depending rods so as to be intercepted by any article executing (B).

10. In apparatus for similarly orienting articles which in arriving at a conveying line article orientation station either (A) turn in a given angular direction at a substantial angle to the infeed direction if the article is in a first orientation, or (B) continue in the infeed direction if the article is in a second and different orientation the improvement comprising at said station a normally stationary rotatable device having a plurality of angularly spaced depending members between at least some of which said articles move while at said station, and means, including means for sensing any article executing a given one of (A) and (B), for rotating said rotatable device and its said depending members to cause that article to execute the other of (A) and (B).

11. Apparatus as in claim 10 wherein said sensing means comprises a switch actuation disposed to be contacted by every article that executes the said given one of (A) and (B).

12. Apparatus as in claim 10 wherein said sensing means comprises beam energy producing means disposed to provide a beam of energy in the pathway of every said article that executes the said given one of (A) and (B) to be interrupted thereby.

13. Apparatus as in claim 10 wherein the said means for rotating the rotatable device includes means for causing the rotatable device to rotate a sensed article in an angular direction opposite to said given angular direction.

14. Apparatus as in claim 10 wherein the said means for rotating the rotatable device includes means for causing the rotatable device to rotate an article that is sensed executing said given one of (A) and (B) an amount approximating the aforesaid angle.

15. Apparatus as in claim 14 wherein the last mentioned means causes such an article to rotate in an angular direction opposite to said given angular direction.

16. Apparatus as in claim 10 wherein said sensing means is disposed to sense (B) and not (A).

17. Apparatus as in claim 10 and further including at said station a normally rotating disc for assisting in executing (A).

18. Apparatus as in claim 10 wherein said means for rotating the rotatable device includes a fluid operated actuating device for angularly stepping said rotatable device and a solenoid valve operative in response to said sensing means for controlling the fluid to said actuating device.

19. Apparatus as in claim 18 wherein said actuating device is a rotary actuator that is reversibly fluid operated, said valve being of the four-way type.

20. Apparatus as in claim 19 and further including stops for limiting the forward and reverse angular movement of said rotary actuator.

21. Apparatus as in claim 19 and further including a coupling mechanism between said actuator and rotatable device for allowing the actuator to drive the rotatable device is one angular direction but not in the other when the actuator is reversibly operated.

22. Apparatus as in claim 18 wherein said actuating device includes a biased-return forwardly fluid operated actuator.

23. Apparatus as in claim 10 including means at said station for stopping feed of articles thereinto during rotation of said rotatable device.

24. Apparatus as in claim 23 wherein said stopping means is coupled to said sensing means for stopping feed as aforesaid when the sensing means senses an article executing the said given one of (A) and (B).

25. Apparatus for similarly orienting articles which in arriving at a conveying line corner at least tend to (A) turn that corner if the article is in a first orientation, or (B) proceed therethrough if the article is in a second and different orientation, comprising means forming a corner including article infeed conveying means for bringing said articles to said corner in either of said orientations, said corner forming means further including article carrying means for imparting to the articles at the corner a movement that is at least partially crosswise of the infeed direction and for assisting in effecting (A), a normally stationary rotatable device disposed over said corner and having a plurality of angularly spaced depending members between at least some of which said articles move while in said corner, and means, including means for sensing any article executing a given one of (A) and (B), for rotating the rotatable device and its said depending members and effectively causing that article to execute the other of (A) and (B).

26. Apparatus as in claim 25 wherein said article carrying means includes outfeed conveying means disposed at said corner relative to said infeed conveying means at approximately 90° in a given angular direction, said sensing means being disposed to sense execution of (B) and not (A) for causing each of said articles to exit from said corner on said outfeed conveying means in said first orientation regardless of whether infeed thereto was in said first or second orientation.

27. Apparatus as in claim 26 wherein said article carrying means further includes a normally rotating disc disposed at said corner between said infeed and outfeed conveying means for imparting controlled motion to the articles rounding said corner.

28. Apparatus as in claim 26 including stopping means operative in response to said sensing means for preventing effective entrance of an article into said corner upon the sensing of an execution of (B) and during the subsequent rotation of that article to said first orientation.

29. Apparatus as in claim 26 wherein said means for rotating the rotatable device includes a reversibly fluid operated rotary actuator, a four-way solenoid valve for controlling fluid thereto in response to said sensing means, means to limit rotation of the actuator in forward and reverse directions to substantially 90°, and ratchet means coupling said actuator to said rotatable device to effect rotation thereof only in the aforesaid forward direction which is opposite to the corner turning direction but to allow reverse direction return of the actuator.

30. Apparatus as in claim 26 wherein said sensing means includes spaced beam energy producing and receiving means disposed so that an article executing (B) interrupts the energy beam therebetween and said receiving means thereupon provides a signal to effect rotation of the rotatable device as foresaid.

31. Article orientation apparatus for similarly facing concavo-convex type containers at an orientation station, comprising:
    means for supplying said containers to said station in either a first orientation in which the convex side of a said container is facing a given direction or in a second orientation in which the concave side of that container is facing said given direction,
    a normally stationary rotatable device having spaced depending members between which said containers move while at said station and which are capable of reorientating a said container from one of said orientations to the other thereof, and
    means, including means operative and non-operative in accordance with which of said container sides faces said given direction at said station for sensing said one orientation, for rotating said rotatable device and its said depending members to cause each such container with that said one orientation to be rotated at said station to the said other orientation.

32. Apparatus as in claim 31 wherein said container supplying means includes a conveyor extending straight through said station.

33. In apparatus for similarly orienting articles one side of each of which has a concave characteristic and another side a convex characteristic, said articles being subject to arriving at an article orientation station in either a first orientation with their said concave side facing a given direction or in a second orientation with their convex side facing said given direction, the improvement at said station comprising:
    a normally stationary rotatable device having spaced depending members between which said articles move while at said station and which are capable of reorienting a said article from one of said orientations to the other thereof, and
    means, including means operative and non-operative according to which of said article sides faces said given direction at said station for sensing an article in said one orientation, for rotating said rotatable device and its said depending members to cause each such article to be rotated thereby to the said other orientation.

34. Apparatus as in claim 33 and further including means for holding a said article in desired position as it is being rotated by the said depending members as aforesaid.

35. Apparatus as in claim 33 including article conveyor means extending straight through said station to effect a cornerless article orientation station.

36. Apparatus as in claim 33 wherein said sensing means includes
energy beam detector means coupled to said rotatable device and
means for directing a beam of energy so that only the articles in said one orientation affect the energy beam in such a manner to cause the detector means to operate the said rotatable device and change such articles to said other orientation.

37. Apparatus as in claim 36 wherein the concave characteristic of said articles reflects more of a concentrated energy beam than does the said convex characteristic thereof and said detector means is disposed to receive energy reflected by said characteristics as said articles pass through said station, said detector means being operative to cause rotation of said rotatable device in response only to energy reflected in said relatively concentrated beam from the concave characteristic of articles entering said station in said one orientation.

38. Apparatus as in claim 37 wherein said holding means includes confining means movable from an outward inoperative position to an inward article holding position in response to the sensing by said sensing means of an article in said one orientation.

39. Apparatus as in claim 37 and further including means, having confining means normally held in an outward inoperative position for allowing articles to move through said depending members but inwardly movable to an article holding position in response to the sensing by said sensing means of an article in said one orientation, for holding said article in position as it is being rotated by said depending members as aforesaid.

40. In apparatus for similarly orienting articles which are subject to arriving at an article orientation station in either a first orientation with a first unique characteristic or a second and different orientation with a second unique characteristic, the improvement at said station comprising:
means, including a normally stationary rotatable device having a plurality of spaced depending members capable of reorienting any said article therebetween upon rotation of said device, for moving said articles between at least some of said depending members and through said station without reorientation if an article is in said first orientation upon arrival at said station, and
means, including means for effectively sensing the said second but not the said first of said unique orientation characteristics of each article between said depending members, for rotating said rotatable device and its said depending members only upon the sensing of said second orientation characteristic to reorient the article to said first orientation.

41. Apparatus as in claim 40 wherein said rotatable device is rotatable in only one direction, and after being rotated in that direction for purposes of reorienting an article said device stays in the rotated position in which said depending members are again in position to receive another article for reorientation or not according to the sensing of said unique characteristics by said sensing means as aforesaid.

References Cited by the Examiner
UNITED STATES PATENTS 3,119,487　1/64　Wyle et al. ____________ 198—33

References Cited by the Applicant
UNITED STATES PATENTS

| | | |
|---|---|---|
| 1,664,144 | 3/28 | Weeks. |
| 2,120,877 | 6/38 | Uber. |
| 2,545,888 | 3/51 | Louden. |
| 2,652,139 | 9/53 | Baehr et al. |
| 2,693,872 | 11/54 | Baader. |
| 2,836,324 | 5/58 | Willis et al. |
| 2,845,164 | 7/58 | Stahl. |
| 2,847,108 | 8/58 | Gross. |
| 3,015,413 | 1/62 | Hengel. |

SAMUEL F. COLEMAN, *Primary Examiner.*

EDWARD A. SROKA, *Examiner.*